United States Patent [19]

Thomassen

[11] 4,152,285

[45] May 1, 1979

[54] CURING AGENT FOR WATER-BASED EPOXY RESINS

[76] Inventor: Ivar P. Thomassen, 1921 Lincoln Way E., Mishawaka, Ind. 46544

[21] Appl. No.: 640,250

[22] Filed: Dec. 12, 1975

Related U.S. Application Data

[63] Continuation of Ser. No. 473,777, May 28, 1974, abandoned, which is a continuation-in-part of Ser. No. 307,937, Nov. 30, 1972, abandoned.

[51] Int. Cl.$^2$ ............................................. C08G 59/50
[52] U.S. Cl. ............................... 252/182; 260/18 EP; 260/29.2 EP; 528/111; 99
[58] Field of Search ..... 260/18 PN, 47 EW, 29.2 EP; 252/182; 106/287

[56] References Cited

U.S. PATENT DOCUMENTS

2,909,448  10/1959  Schroeder ...................... 260/47 EN

OTHER PUBLICATIONS

Offeniegungsschrift 1,520,918 Apr. 30, 1970.

*Primary Examiner*—Theodore Morris

[57] ABSTRACT

The present invention relates to curing agents for epoxy resins. More particularly, the present invention relates to water soluble or water-dispersible curing agents which are mixed with water dispersed or water emulsified epoxy resins to form coating compositions which are essentially free of volatile organic solvents or cosolvents and which have extended pot life at room temperature, but which cure under ambient conditions in less than 24 hours.

7 Claims, No Drawings

CURING AGENT FOR WATER-BASED EPOXY RESINS

The present application is a continuation of copending application Ser. No. 473,777, filed May 28, 1974 which in turn is a continuation-in-part of copending application Ser. No. 307,937 filed Nov. 30, 1972, both now abandoned.

BACKGROUND

Various chemical substances have heretofore been employed as hardening agents for epoxy resins. Most usually these hardening agents have been organic acid anhydrides or amines, although other agents have been used. While some of the hardening agents have been described as being water dispersible (U.S. Pat. No. 3,467,684), such hardening agents have a number of drawbacks when mixed and used with water dispersed or emulsified epoxy resins. The viscosity of the resultant mix increases rapidly and gelation of the mixed components occurs in a very short time, because of the lack of compatability between the two coreactants. As the mutual solubility of the two coreactants decreases, the viscosity of the mixture increases greatly, which in turn reduces or diminishes the desirable film characteristics of the mixture. While this problem can be overcome in part through the use of solvents, the inclusion of even small amounts of organic solvents, as is required by the presently available curing agents, creates an odor and fume problem, which is particularly troublesome when the compositions are used in such odor-sensitive areas as hospitals, bakeries, kitchens, and the like.

In addition to the fact that the prior art compositions have a short pot life, the gloss of coatings produced therefrom varies during the life of the mixed batch. The coatings resulting from coating compositions produced from the initial mixing of the prior art curing agents and the resin emulsion or dispersion have a high gloss, but as the work progresses during the application, the gloss of the coating decreases and the coatings produced from compositions near the end of their pot life have low gloss. This problem is especially noticeable when large areas are being coated and is further manifested when touch-up work is undertaken, wherein the touch-up paint will not match the original paint with respect to the gloss.

The novel curing agents of the present invention have greatly increased solubility or dispersibility in water, which allows the reaction between the new curing agent and the epoxy water emulsion (or dispersion) to proceed at a controlled rate. Therefore, use of these novel curing agents will result in a substantial increase in the usable room temperature pot life of the mixed system. The coating systems formed using the novel curing agents of the present invention cure readily at ambient conditions to produce film properties such as gloss, adhesion, chemical resistance, scrubability, and flexibility which are greatly enhanced; in fact, some of the cured film properties of epoxy coating systems utilizing these novel curing agents will actually exceed those of comparable solvent-based epoxy coating systems. In addition, the coating system cured with the curing agents of the present invention will produce uniformly good film properties whether applied soon after mixing the coreactants or applied near the end of the usable pot life of the mixture.

BRIEF DESCRIPTION OF THE INVENTION

The present invention provides curing agents which are water-soluble or water-dispersible hydroxylated polyamines, which optionally may contain amide groups. The curing agents of the present invention are prepared by the reaction of aliphatic polyamine compounds with aliphatic or cycloaliphatic polyepoxy materials, and may be produced by a variety of different processes. Generally speaking, the curing agents are alkaline products having a pH of above about 9.0, which are produced by treating the polyepoxy materials with a polyamine which may be an alkanol polyamine and may have amide groups therein. The basic nature of the curing agents of the present invention permits the curing reaction with the epoxy resin to proceed smoothly at room temperature, thus making the use of elevated temperatures unnecessary. Polybasic acids may be used to increase the molecular weight of the curing agent through reactions with polyamine or the alkanol polyamine or by reacting with the hydroxylated polyamines, but care must be taken to avoid reducing the pH below 9.0, as is now fully explained below.

The curing agents of the present invention are prepared using sufficient polyamine to react with all of the epoxy groups present on the aliphatic or cycloaliphatic polyepoxy material. Further, one must use sufficient polyamine or alkanol polyamine to neutralize any polybasic acid which may be used and to maintain the pH of above about 9.0. Thus, the curing agents of the present invention are hydroxylated polyamines or hydroxylated amido polyamines, which are substantially free of unreacted carboxylic acid groups, are substantially free of unreacted epoxy groups, and are preferably free of ester groups. The curing agents must have a pH above about 9.0 and have amine values in the range of about 150 to about 800 and preferably in the range of about 500 to about 700, on a solids basis, although the curing agents (and their amine values) are usually reduced with water prior to use. The curing agents of the present invention generally have a molecular weight of from about 280 to about 1500, with the range of about 500 to about 700 being preferred. Preferably the curing agents of the present invention contain from 2 to about 10 hydroxyl groups per molecule.

DETAILED DESCRIPTION

One of the essential raw materials used in producing the curing agents of the present invention is the aliphatic or cycloaliphatic polyepoxy material. While the hydroxylated polyamine curing agents of the present invention can be prepared by different synthesis routes, all routes require at least one polyepoxy material. The polyepoxy materials must be essentially aliphatic or cycloaliphatic in nature, although small portions of aromatic polyepoxy materials may be tolerated in some systems. The epoxy functionality must average at least 2, and may be as high as about 5.3. The molecular weight may run from 170 to about 1000 or more, whereby the equivalent weight will be from 85 to about 500.

The present invention contemplates the following types of polyepoxy materials as being useful:
1. Glycidyl Ethers of Aliphatic Polyols $$CH_2\text{——}CH\text{—}CH_2\text{—}O\text{—}[\text{—}CH\text{—}(CH_2\text{—})_mO\text{—}]_nCH_2\text{—}CH\text{——}CH_2$$
$$\text{with epoxide O on ends and } R_1 \text{ on middle CH}$$

wherein
$R_1$ = H, CH$_3$, or CH$_2$X (where X represents a halogen)
n = 1 to 20
m = 1 to 5

EXAMPLE A

Diglycidyl ether of polypropylene glycol
[polypropylene glycol di (2,3-epoxypropyl) ether]

$$CH_2\text{——}CH\text{—}CH_2\text{—}O\text{—}\left[\text{—}CH(CH_3)\text{—}CH_2\text{—}O\text{—}\right]_n\text{—}CH_2\text{—}CH\text{——}CH_2$$

EXAMPLE B

Triglycidyl ether of glycerol [1,2,3-tris (2,3-epoxypropoxy) propane]

$$H_2C\text{—}O\text{—}CH_2\text{—}CH\text{——}CH_2$$
$$HC\text{—}O\text{—}CH_2\text{—}CH\text{——}CH_2$$
$$H_2C\text{—}O\text{—}CH_2\text{—}CH\text{——}CH_2$$

2. Epoxidized Polyolefins

EXAMPLES

Epoxidized vegetable oils or tri-glycerides such as soybean, linseed, and castor.

3. 1,3-Bis[3-(2,3-epoxypropoxy)propyl]tetramethyl disiloxane:

$$CH_2\text{——}CH\text{—}CH_2\text{—}O\text{—}CH_2\text{—}CH_2\text{—}CH_2\text{—}Si(CH_3)_2\text{—}O\text{—}Si(CH_3)_2\text{—}CH_2\text{—}CH_2\text{—}CH_2\text{—}O\text{—}CH_2\text{—}CH\text{——}CH_2$$

4. Bis(2,3-epoxycyclopentyl)ether:

[structure: two epoxycyclopentyl rings connected by O]

5. Bis(3,4-epoxy-6-Methylcyclohexylmethyl)adipate:

[structure with two epoxy-methylcyclohexyl groups connected via $\text{—}CH_2\text{—}O\text{—}C(=O)\text{—}(CH_2)_4\text{—}C(=O)\text{—}O\text{—}CH_2\text{—}$]

It is possible to substitute up to about 25% by weight of an aromatic epoxidized material for the epoxidized aliphatic or cycloaliphatic materials, but the water solubility decreases rapidly as the aromatic epoxidized material is added. For instance, up to about 25% of diglycidyl ether of bisphenol A may be used, without causing total insolubility of the curing agent.

The second essential material is the polyamine, which must be essentially aliphatic and must contain at least one primary amine group per molecule. The polyamines may contain one or more hydroxy groups and may contain intermediate amide groups. The present invention contemplates the following types of polyamines as being useful.

1. Polyamines

EXAMPLE A

Alkylene amines:

$$H_2N(CH(R)\text{—}CH_2\text{—}NH)_nH$$

where n = 1 to 4 and R = H or CH$_3$ (Examples would include Ethylene Diamine, Diethylene Triamine, Triethylene Tetramine, Tetraethylene Pentamine, Propylene Diamine).

EXAMPLE B

Alkanolamines
N(2-hydroxypropyl)ethylenediamine:

$$H_2N\text{—}CH_2\text{—}CH_2\text{—}NH\text{—}CH_2\text{—}CH(OH)\text{—}CH_3$$

N-Aminoethyl Ethanolamine:

$$H_2N\text{—}C_2H_4NH\text{—}C_2H_4OH$$

9-$\beta$-Aminoethylamino-10-Hydroxy stearylamine:

$$CH_3(CH_2)_7CH(OH)CH(NHC_2H_4NH_2)(CH_2)_8NH_2$$

2. Amidopolyamines derived from the reaction of aliphatic polyamines and dibasic and tribasic carboxylic acids of the C$_4$ to C$_{54}$ type.

As is more fully explained below, various polybasic acids may be used to increase the molecular weight (and increase the equivalent weight) of the curing agents, but the quantity used must not reduce the pH substantially below about 9.0. The polybasic acids are reacted with the amine groups of the polyamine to form amide groups. The amide groups contain a single active hydrogen and are only slightly reactive in the curing reaction, but are important since they tend to retard the curing reaction and to increase the useful pot life. In using the polybasic acids the formation of ester groups should be avoided, since the ester groups tend to saponify. Representative types of polyfunctional carboxylic acids which may be used are:

1. Dibasic acids of the type HOOC(CH$_2$)$_n$ COOH with n = 2 - 36 and their acid anhydrides. (Specific examples would include succinic acid or anhydride, adipic acid, azelaic acid, sebacic acid).

2. Unsaturated dibasic acid of the type HOOC—CH = CH—COOH (Specific examples would include maleic acid or anydride, and fumaric acid).

3. Polybasic Hydroxy acids such as malic, tartaric and citric acids.

4. Trimer fatty acids of the C$_{54}$ tribasic acid type.

5. Dimer fatty acids such as the C$_{36}$ dibasic acid type.

6. Aromatic di, tri and tetra carboxylic acids and their anhydrides (phthalic, isophthalic, terephthalic, trimellitic and pyromellitic acids and anhydrides, for example).

The formation of the hydroxylated polyamine curing agents of the present invention may be approached by various methods, but the three different synthesis routes described below are representative. All three processes can be carried out in a conventional reaction vessel equipped with agitator, condenser, water trap, and cooling coils. The completeness of reaction is readily monitored by amine value, pH, acid value, volume of condensed water or infrared spectroscopy. The finished product can be readily reduced with water to a convenient viscosity and solids range (normally 30-75% by weight). The routes may be described as follows:

Process 1

One or more of the polyepoxy materials may be reacted with an aliphatic polyamine to form a hydroxylated polyamine, which may be used directly as the water soluble epoxy curing agent. This reaction can be illustrated as follows:

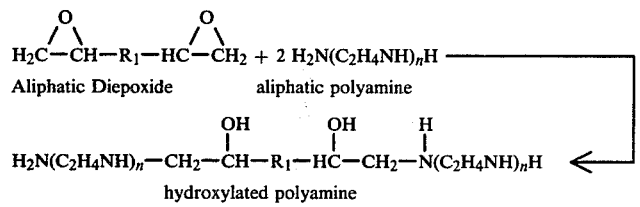

Process 2

The hydroxylated polyamine derived from process 1 can be further reacted with one or more polybasic acids to form a hydroxylated amidopolyamine which can then be used as the water soluble epoxy curing agent. This process can be illustrated as follows:

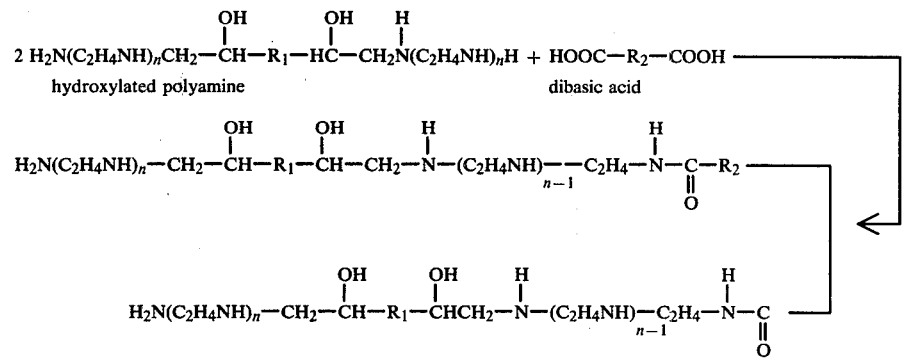

Process 3

A polybasic acid may be reacted with an aliphatic polyamine to form an amidopolyamine, which is then reacted with an epoxidized aliphatic material to form a hydroxylated amidopolyamine which is water soluble and therefore can be used as the curing agent for the water soluble or water dispersible epoxy resin system. This process can be illustrated as follows:

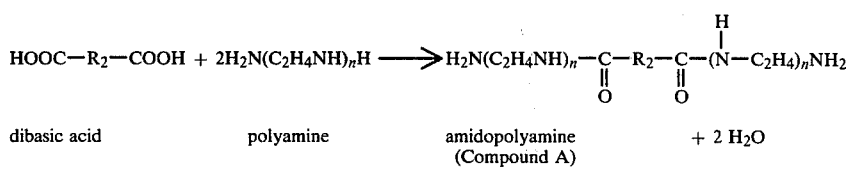

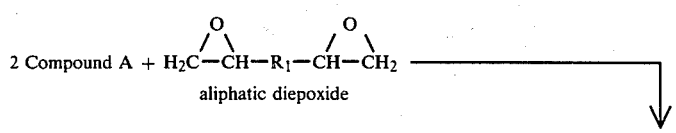

-continued

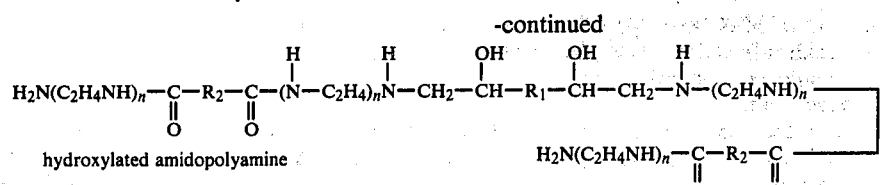

In preparing the hydroxylated polyamine curing agents of the present invention it is essential to use sufficient polyamine to react with all of the epoxy groups of the polyepoxy material. It is preferred to use a ratio of equivalents ($NH_2$ to

of at least 2:1, in order to minimize crosslinking during this step. Higher ratios may be used, and the present invention contemplates ratios of as high as 8:1, but about 2.5:1 is preferred. The actual molar ratio of the reactants will vary depending upon the functionality of the reactants used. The number of hydroxyl groups present in the hydroxylated polyamine curing agents is proportionate to the functionality of the polyepoxide component. It has been determined that as the number of hydroxyl groups in the curing agent increases, the water solubility of the curing agent increases, but the water sensitivity of the cured film increases. Therefore it is important to control the number of hydroxyl groups on the curing agents in order to obtain a balance between the water solubility of the curing agents and the water sensitivity of the cured film. The primary source of the hydroxyl groups is the amine-epoxy reaction, although the use of hydroxyl functional acids, e.g. citric acid or hydroxylated polyamines represent other possible sources of hydroxyl groups. Thus, controlling the proportion of epoxy groups reacted in producing the curing agent will control the number of hydroxyl groups of the curing agent and produce the desired balance of properties.

The polyfunctional carboxylic acids may be used in connection with production of the curing agents in various amounts, but the amounts used must be controlled to maintain the pH above about 9.0. The purpose of the carboxylic acids is to react with primary amine groups and control the amine value of the curing agent, as well as the viscosity of the coating composition and the flexibility, chemical resistance, gloss and other properties of the cured final product. So long as the curing agent maintains a pH above about 9.0, the amount of polycarboxylic acid is determined primarily according to the molecular weight which is desired for the curing agent.

The curing agents of the present invention may be used with various types of epoxy resins including any water soluble or water dispersible resins. Generally speaking best results have been achieved with liquid bisphenol A-epi chloro-hydrin type resins with epoxy equivalent weights in the 180-200 range. It is contemplated, however, that many water dispersible epoxy resins could be used and that resins having epoxy equivalent weights up to 550 are curable with the curing agents of the present invention. Specific examples of commercially available resins which may be cured using the curing agents of the present invention are Epi-Rez WD-510 from Celanese Resins and Gen Epoxy M-200 or M-205 from General Mills.

The curing agents of the present invention are preferably used with no organic solvents or cosolvents, so that the coating compositions are free of volatile organic solvents, organic coupling solvents and similar non-solids material. The curing agents of the present invention are also free of emulsifying agents, such as non-ionic surfactants although such emulsifying agents are frequently used in the pigmented epoxy resin portion to improve tintability and pigment wetting. Practical, two-component, epoxy-water emulsion (or dispersion) systems, pigmented or unpigmented, can be formulated using the novel curing agents described herein. The elimination of all organic solvents means that a product with all of the inherent advantages of typical epoxy resin systems can now be offered which will eliminate air pollution, fire hazards, and odor problems associated with the organic solvents previously used.

The following examples will serve to illustrate the preparation and use of several epoxy curing agents, but it is understood that these are set forth for illustrative purposes and many other curing agents are within the scope of the present invention.

EXAMPLE 1

Into a three necked flask equipped with condenser, agitator, and water trap, the following amounts of materials were introduced:

376.0 grams (2 moles) azelaic acid
584.0 grams (4 moles) triethylene tetramine

The reaction mixture was thoroughly agitated and heated gradually; an exothermic reaction took place at approximately 165° C. with the evolution of water. The temperature of the reaction mixture was gradually increased to approximately 220° C. and held until the theoretical amount of water had been eliminated (4 moles). The reaction product was cooled to 125° C. and 320 grams (0.5 mole) of polypropylene glycol di(2,3-epoxypropyl) ether was added. The temperature was then increased to 150° C. and held until the reaction was complete. The resultant reaction product was cooled at 100° C. and 401.50 grams water was added. The final product had an amine value of 695, a pH of 9.7, Gardner viscosity of Z6, and Gardner color of 5-6.

EXAMPLE 2

A clean glass reaction flask equipped with an agitator was utilized. The following items were introduced into the reaction flask:

292.48 grams (2 moles) triethylene tetramine
640.00 grams (1 mole) polypropylene glycol di 2,3-epoxypropyl ether The coreactants were thoroughly mixed and heated 70° C. under continuous agitation. Once the reaction was initiated, the mixture was allowed to exotherm, with temperature not allowed to exceed 150° C. After the reaction was complete, the material was cooled at 100° C. and 311 grams of water added. The resultant product has an amine value or 570, a pH of 9.7, a Gardner viscosity of Y-Z at 50% non-volatile, and a Garnder color of 3-4.

EXAMPLE 3

A three neck flask equipped with condenser, agitator, and water trap was charged with the following mixture:
 104.15 grams (1 mole) aminoethyl ethanolamine
 309.51 grams (3 moles) diethylene triamine
 329.00 grams (1.75 moles) azelaic acid The mixture was heated to 110° C. and the following added: 141.25 grams (0.25 mole) dimer fatty acids. The temperature was then increased to 170° C. at which point the reaction began and water began to condense in the trap. The temperature was gradually increased to 230° C. and held until the theoretical amount of water (72 grams; 4 moles) had been eliminated. The reaction product was then cooled to 150° C. and the following added:
 320.00 grams (0.50 mole) polypropylene glycol di(2,3-epoxypropyl) ether After the exothermic reaction had subsided, the reaction product was cooled to 100° C. and reduced to 50% non-volatile with water. The resultant product had an amine value of 440, pH of 9.9, Gardner viscosity of W, and a Gardner color of 4-5.

EXAMPLE 4

Into a three necked flask equipped with condenser, agitator, and water trap, the following materials were charged:
 584.00 grams (4 moles) triethylene tetramine
 470.00 grams (0.5 mole) epoxidized soybean oil (epoxy equivalent weight 229).

The mixture was heated to 140° C. and the following added: 376 grams (2 moles) azelaic acid. The temperature was gradually increased and the reaction initiated at approximately 180° C. Temperature was gradually increased to 230° C. and held until the theoretical amount of water (72 grams; 4 moles) had been condensed in the water trap. Then the reaction product was cooled to 100° C. and reduced to 50% non-volatile with water. The resultant reaction product had an amine value of 508, a pH of 10.2, Gardner viscosity of Y-Z, and a Gardner color of 6-7.

EXAMPLE 5

Into a three necked flask equipped with condenser, agitator, and water trap, the following items were charged:
 296.56 grams (4 moles) propylene diamine
 320.00 grams (½ mole) polypropylene glycol di(2,3-epoxypropyl) ether The reaction mixture was heated to 70° C., at which point an exothermic reaction was noted. The exotherm was controlled so as not to exceed 110° C. When the exothermic reaction subsided, the temperature was gradually increased to 140° C. and the following added: 141.25 grams (0.25 mole) dimer fatty acids; 329.00 grams (1.75 moles) azelaic acid. The mixture was gradually heated to 165° C., at which point water began to condense in the trap. The temperature was then gradually increased to 230° C. and held until the theoretical amount of water had been collected (72 grams; 4 moles). The reaction product was cooled to 100° C. and reduced to 50% non-volatile with water. The resultant product had an amine value of 222, a pH of 9.7, a Gardner viscosity of V-W, and a Gardner color of 4-5.

EXAMPLE 6

An epoxy emulsion block filler was prepared by thoroughly dispersing the following ingredients in a commercial high speed disperser:
 328.64 grams of water
 3.50 grams methyl cellulose
 2.00 grams potassium tripolyphosphate
 4.43 grams alkylphenoxypoly (ethyleneoxy) ethanol
 17.60 grams polyoxyethylated vegetable oil
 27.87 grams ethylene glycol
 3.28 grams defoamer
 0.50 gram preservative
 100.00 grams titanium dioxide
 250.00 grams magnesium silicate
 125.00 grams amorphous silica
 20.00 grams diatomaceous silica
 500.00 grams calcium carbonate
 130.28 grams emulsified epoxy resin (equivalent weight = 200)

The completed epoxy emulsion block filler had a viscosity of 136 Krebs Units and a weight/gallon of 14.74 pounds.

EXAMPLE 6A

A 4.0 gallon portion of the epoxy block filler described in Example 6 was mixed with 0.5 gallons of the hydroxylated amido polyamine product of Example 1 (volume ratio of 8:1) to provide 4.5 gallons of block filler composition. The complete block filler composition had a minimum useful pot life of 6 hours at room temperature and had excellent application properties. The composition cured to a hard film in 24 hours at ambient conditions.

EXAMPLE 6B

A 1.0 quart portion of the epoxy block filler of Example 6 was mixed with 4 ounces of the hydroxylated polyamine product of Example 2 (volume ratio of 8:1) to provide about one quart of block filler composition. The complete block filler composition had a minimum useful pot life of 4 hours at room temperature, and had excellent application properties. The composition cured to a hard film in 24 hours at ambient conditions.

EXAMPLE 7

An epoxy emulsion high gloss enamel was prepared utilizing the following ingredients:
 232.96 grams water
 1.00 gram methyl cellulose
 2.00 grams defoamer
 51.10 grams ethylene glycol
 17.60 grams polyoxyethylated vegetable oil
 20.40 grams acrylic derived polyelectrolyte
 528.00 grams titanium dioxide
 482.50 grams emulsified epoxy resin (equivalent weight = 200)

The above ingredients were thoroughly mixed and ground on a 3 roller mill to a fineness of grind of 7. The resultant material had a viscosity of 102 Krebs Units and a weight/gallon of 12.93 pounds.

EXAMPLE 7A

A one-half gallon portion of the epoxy emulsion high gloss enamel of Example 7 was then mixed with a half gallon of the hydroxylated amido polyamine reaction product of Example 3 (ratio of 1:1 by volume) to produce one gallon. The catalyzed high gloss enamel had a useful pot life of about 2.5 to 3 hours at room temperature and excellent application properties. It cured to a hard film in 24 hours at ambient conditions. The cured film has a 60° gloss of 70–80, and had excellent physical properties and chemical resistance.

EXAMPLE 7B

A one-half gallon portion of the epoxy emulsion high gloss enamel of Example 7 was then mixed with one-half gallon of the hydroxylated amido polyamine of Example 4 (ratio of 1:1 by volume) to produce one gallon. The catalyzed high gloss enamel had a minimum useful pot life of 4 hours at room temperature and excellent application properties. It cured to a hard film in 24 hours at ambient conditions. The cured film had a 60° gloss of 70–80, and had excellent physical properties and chemical resistance.

EXAMPLE 8

The following materials were charged into a three necked flask equipped with condenser, agitator and water trap:
  208.30 grams (2 moles) N-aminoethyl ethanolamine
  206.34 grams (2 moles) diethylene triamine
  296.22 grams (2 moles) phthalic anhydride The temperature was gradually raised to a maximum of 240° C. (reaction initiated at 165°–170° C.) and held until the theoretical amount of water had been condensed in the trap. The reaction product was then cooled to 150° and 320.00 grams (0.50 mole) of polypropylene glycol di(2,3-epoxypropyl) ether was added to the reaction mixture. An exothermic reaction ensued, with temperature rising to 160° and then falling slightly, indicating that the reaction was complete. The reaction product was then cooled to 100° C. and 645 grams of water added to yield a product with 50% solids. The resultant product has an amine vaue of 477, a pH of 9.6, Gardner viscosity of G-H, and a Gardner color of 18+.

EXAMPLE 9

Into a reaction flask equipped with agitator and a cooling jacket were charged the following:
  280.00 grams (approximately 1 mole) of triglycidylether of glyerol
  208.30 grams (2 moles) N-aminoethyl) ethanolamine An exothermic reaction was immediately initiated, with the temperature held below 115° C. through cooling of the reaction flask. After the exotherm had subsided (indicating completion of the reaction), the material was cooled to 100° C. and 163 grams of water added. Resultant 50% solids product had an amine value of 581, a pH of 10.1, a Gardner viscosity of $Z_2$–$Z_3$, and a Gardner color of 2–3.

EXAMPLE 10

Into a three necked flask equipped with agitator, condenser, and water trap were introduced the following:
  412.68 grams (4 moles) diethylene triamine
  376.00 grams (2 moles) azelaic acid
  141.25 grams (0.25 mole) dimer fatty acids of the $C_{36}$ type The temperature was gradually raised with condensation initiating at 175° C. The temperature was gradually increased to 230° C. and held until the reaction was complete, as indicated by the condensation of the theoretical amount of water (4.5 moles, or 81 grams). The reaction product was then cooled to 200° C. and 394.5 grams (1 mole) of bis(3,4-epoxy-6-methylcyclohexylmethyl) adipate added to the reaction mixture. The mixture was held at 200° C. until the reaction was complete, as determined by the amine value, after which the reaction product was cooled to 100° C. and 1229 grams of water added. The resultant product had an amine value of 550, a pH of 9.7, a Gardner viscosity of Q-R, and a Gardner color of 4–5.

EXAMPLE 11

Into a three necked flask equipped wih agitator, condenser and trap, the following were introduced:
  188.00 grams (1 mole) azelaic acid
  206.34 (2 moles) diethylene triamine The reaction mixture was gradually heated, with condensation starting at about 170° C. The temperature was gradually increased to 240° C. and held until the reaction was complete, as determined by the amine and acid values. The reaction product was then cooled to 150° C. and 181.1 grams (0.50 mole) of 1,3-bis[3-(2,3-epoxypropoxy)propyl] tetramethyldisiloxane added to the reaction mixture. An exothermic reaction ensued, with the temperature rising 10°–15° C. When the exotherm subsided, indicating completeness of the reaction, the reaction product was cooled to 100° C. and 539.4 grams of water added. The resultant 50% solids reaction product had an amine value of 623.9, a pH of 11.0, Gardner viscosity of H-I, and a Gardner color of 6–7.

The amount of curing agent necessary to cure the specific epoxy resin can be calculated from the amine value of the curing agent and the epoxy equivalent weight of the epoxy resin. From about 80 to about 120% of the stoichiometric requirement of curing agent, based on the epoxy equivalent weight, is desirable to give a hard cured coating.

The pot life actually achieved by the materials described herein will vary somewhat depending upon the quantity of the material mixed and the temperature at which the mixed material is held. The higher temperatures and the greater quantity of material mixed at any given time, the shorter will be pot life. For example, the product described in Example 6 is mixed with one part by volume of the curing agent described in either Examples 1 or 2, in Examples 6A and 6B, to produce compositions with a minimum pot life of six to eight hours. If the quantity of material mixed is sufficient to make about one gallon of coating, and it is held at about 70° F., the minimum useful pot life will be 8 hours, on the average.

Similarly, mixing one part by volume of the material described in Example 7 with one part by volume of the curing agents described in Examples 3, 4, or 8 will result in a usable mixed pot lift of at least 3–4 hours.

The forms of invention herein shown and described are to be considered only as illustrative. It will be apparent to those skilled in the art that numerous modifications may be made therein without departure from the spirit of the invention or the scope of the appended claims.

I claim:

1. A curing agent for a water dispersible or water soluble epoxy resin wherein the curing agent is capable of producing a curing reaction at room temperature in approximately 24 hours or less with the water dispersible or water soluble epoxy resin, which curing agent consists essentially of a mixture of water and hydroxylated polyamine, which is the reaction product produced when an aliphatic polyepoxide and an aliphatic polyamine having at least one primary amine group are reacted together, said hydroxylated polyamine having an amine value of from about 150 to about 800, a molecular weight of from about 280 to about 1500 and contains from two to about ten hydroxyl groups per molecule and being water soluble or water dispersible without the use of organic solvents, co-solvents or emulsifiers, said mixture of water and hydroxylated polyamine having a pH between about 9.0 to about 12.0 and being substantially free of organic solvents and substantially free of ester groups.

2. A curing agent as described in claim 1 wherein said hydroxylated polyamine is a hydroxylated amido polyamine.

3. A curing agent as described in claim 1 wherein said hydroxylated polyamine has an amine value of from about 500 to about 700, and a molecular weight of from about 500 to about 700.

4. A water-dispersible or water soluble curing agent for epoxy resins wherein the curing agent is capable of producing a curing reaction at room temperature in approximately 24 hours or less with the epoxy resins, which curing agent comprises a mixture of water and the reaction product produced when an aliphatic polyepoxide and an aliphatic polyamine having at least one primary amine group are reacted together, said reaction product having an amine value of from about 150 to about 800, a molecular weight of from about 280 to about 1500 and contains from two to about ten hydroxyl groups per molecule and being water soluble or water dispersible in the substantial absence of organic solvent, co-solvents and emulsifiers, said mixture of water and the reaction product having a pH between about 9.0 to about 12.0 and being substantially free of ester groups.

5. A curing agent as described in claim 4 wherein said reaction product comprises at least 2 amine equivalents of said polyamine for each epoxy equivalent of said polyepoxide.

6. A curing agent as described in claim 5 wherein said reaction product has an amine value of from about 500 to about 700, and a molecular weight of from about 500 to about 700.

7. A curing agent as described in claim 4 wherein up to about 25% of the epoxy equivalents of the aliphatic polyepoxide is replaced by the same number of epoxy equivalents from an aromatic polyepoxide.

* * * * *